2,808,379

PROCESS FOR FOAMING RESINS USING FURAN ADDUCT FOAMING AGENTS AND FOAMABLE COMPOSITIONS CONTAINING SAME

Henry A. Walter, Longmeadow, Mass., assignor to Monsanto Chemical Company, St. Louis, Mo., a corporation of Delaware No Drawing. Application August 30, 1954, Serial No. 453,131

7 Claims. (Cl. 260—2.5)

This invention relates to synthetic resin foams. More particularly, the invention relates to a process for preparing synthetic resin foams.

There are several known methods for preparing synthetic resin foams. One involves incorporating a gas into the resin under high pressures, followed by release of the pressure under controlled conditions. Another method requires incorporating a substance in the resin which may later be dissolved from the resin by nonsolvents for the resin. Still another method involves adding a blowing agent to the synthetic resin during the process for preparation of the resin, followed by a heat treatment to activate the blowing agent. A preferred method is to incorporate a solid material into the synthetic resin at temperatures below the blowing temperature and then raising the temperature to activate the blowing agent. Unfortunately, only a few materials have been found which are applicable to the preferred process and most of these are either not applicable to the majority of synthetic resins or their decomposition products have undesirable physical or chemical effects on the foamed resins.

One object of this invention is to provide foamed synthetic resins.

A further object is to provide new foaming agents for preparing synthetic resin foams.

Still another object is to provide a process for preparing synthetic resin foams.

These and other objects are obtained by incorporating in a synthetic resin certain Diels-Alder adducts as hereinafter defined, and then raising the temperature to from 130° C. to a temperature not in excess of that at which the resin decomposes.

The Diels-Alder adducts of this invention are addition products of furan and maleic acid, maleic anhydride, fumaric acid, or the acid chlorides or esters of these acids. The adducts are easily prepared by mixing the two components in substantially equimolecular proportions in a common solvent at temperatures from −40° C. to 50° C. They are crystalline materials or viscous liquids. The adducts of the maleic esters are difficult to make by the simple addition process and can be more easily made by reacting the furan with the acid chloride followed by reaction of the adduct with an alcohol to replace the chlorine with an ester group. They may be incorporated into synthetic resins in amounts ranging from 1 to 50 parts per 100 parts of resin. The amount of adduct used will depend on the particular foam density required for a particular resin.

Conveniently, the adducts are added to the resin while the resin is in a thermoplastic condition on heated milling rolls, Banbury mixers, extruders, etc., care being taken to control the mixing operation to keep the temperature of the operation below 125° C. After the adduct has been thoroughly intermingled with the resin, the resin may be comminuted to form a molding powder and extruded or molded at temperatures from 130° C. to the decomposition temperature of the resin to form the desired foams. The foaming temperature depends on the composition of the adduct and on the nature of the resin being foamed. For example, the maleic anhydride-furan adduct starts to decompose at 125° C. and the decomposition becomes rapid enough at 130° C. to yield a low density fine-pore foam.

The following examples are given in illustration and are not intended as limitations on the the scope of this invention. Where parts are mentioned, they are parts by weight.

*Example I*

Prepare a Diels-Alder adduct of furan and maleic anhydride by mixing the two together in equimolecular proportions in a common solvent such as ether. The reaction takes place at room temperature, i. e., 20–35° C., to yield a crystalline product having a melting point of about 125° C. Add 50 parts of the crystalline adduct to 1000 parts of polystyrene on milling rolls maintained at about 80° C. After the adduct has been thoroughly dispersed in the polystyrene, remove the polystyrene from the rolls in a rough sheet. Place a piece of the sheet in an open mold and heat it at 130–140° C. for a few minutes. In the heating operation, the adduct decomposes and expands the polystyrene into a product of low specific gravity filled with small discrete pores or bubbles. The sheet taken from the mill roll may be comminuted to produce a molding powder which may be then treated by compression molding methods, extrusion, etc. at temperatures above 130° C. to produce foamed polystyrene.

*Example II*

Mix 10 parts of the furan-maleic anhydride adduct with 100 parts of a fusible phenol-formaldehyde resin containing no catalyst on hot milling rolls at about 100° C. until the adduct is thoroughly mixed into the resin. Remove the resin from the roll, cool it to room temperature and pulverize it. The pulverized material may be foamed in an open mold or in a partially filled closed mold by heating at a temperature above 130° C. The adduct releases maleic anhydride when it decomposes and the anhydride acts as a latent curing catalyst for the phenolic resin with the result that the resin cures as it foams.

The foaming agents of this invention are applicable to synthetic resins which do not decompose at temperatures of 130° C. and which are at least temporarily fusible at that temperature. Among the resins which may be used are most of the addition polymers prepared by polymerization of ethylenically unsaturated monomers, the condensation polymers from urea, phenols, aminotriazines, etc. and the polyester or polyester-amide condensation products prepared from polyhydric alcohols and polybasic acids with or without polyamines, monobasic acids and monohydric alcohols. The condensation resins should be in their intermediate stage, i. e., fusible stage.

The foaming agents may be mixed with the resins on heated milling rolls, Banbury mixers, etc. providing care is used to keep the temperature below 125° C. They may also be incorporated in solutions or dispersions of the resins in organic solvents or water.

The foams may be prepared by heating the resin-adduct mixture at temperatures from 130° C. up to the decomposition temperature of the resin. Preferably, the temperature should range from 130 to 200° C. The foaming may take place in open molds or in closed molds. In the latter case, the molds should be partially filled with resin-adduct mixture, the amount of foamable material being regulated by the amount of adduct used, which in turn regulates the extent of the expansion during foaming. The resin-adduct mixture may also be foamed by hot extrusion into molds.

What is claimed is:

1. A process for preparing foamed synthetic resins which comprises mixing a fusible synthetic resin with a Diels-Alder adduct of furan and a compound taken from the group consisting of maleic acid, maleic anhydride, fumaric acid, the acid chlorides thereof and the esters thereof, said mixing step being carried out at temperatures below 125° C. and then subjecting the mixture to a temperature of from 130° C. to 200° C.

2. A foamable synthetic resin composition comprising a mixture of 100 parts of a synthetic resin and 1 to 50 parts of Diels-Alder adduct of furan and a compound taken from the group consisting of maleic acid, maleic anhydride, fumaric acid, the acid chlorides thereof and the esters thereof.

3. A foamable composition as in claim 2 wherein the adduct is a furan-maleic anhydride adduct.

4. A foamable composition as in claim 2 wherein the synthetic resin is an addition polymer prepared by polymerization of an ethylenically unsaturated monomer.

5. A foamable composition as in claim 4 where the synthetic resin is a polymer of styrene.

6. A foamable composition as in claim 2 wherein the synthetic resin is a condensation polymer.

7. A foamable composition as in claim 6 wherein the synthetic resin is a phenol-formaldehyde resin.

References Cited in the file of this patent

UNITED STATES PATENTS

| | | |
|---|---|---|
| 2,532,242 | Ott | Nov. 28, 1950 |
| 2,653,139 | Sterling | Sept. 22, 1953 |